UNITED STATES PATENT OFFICE.

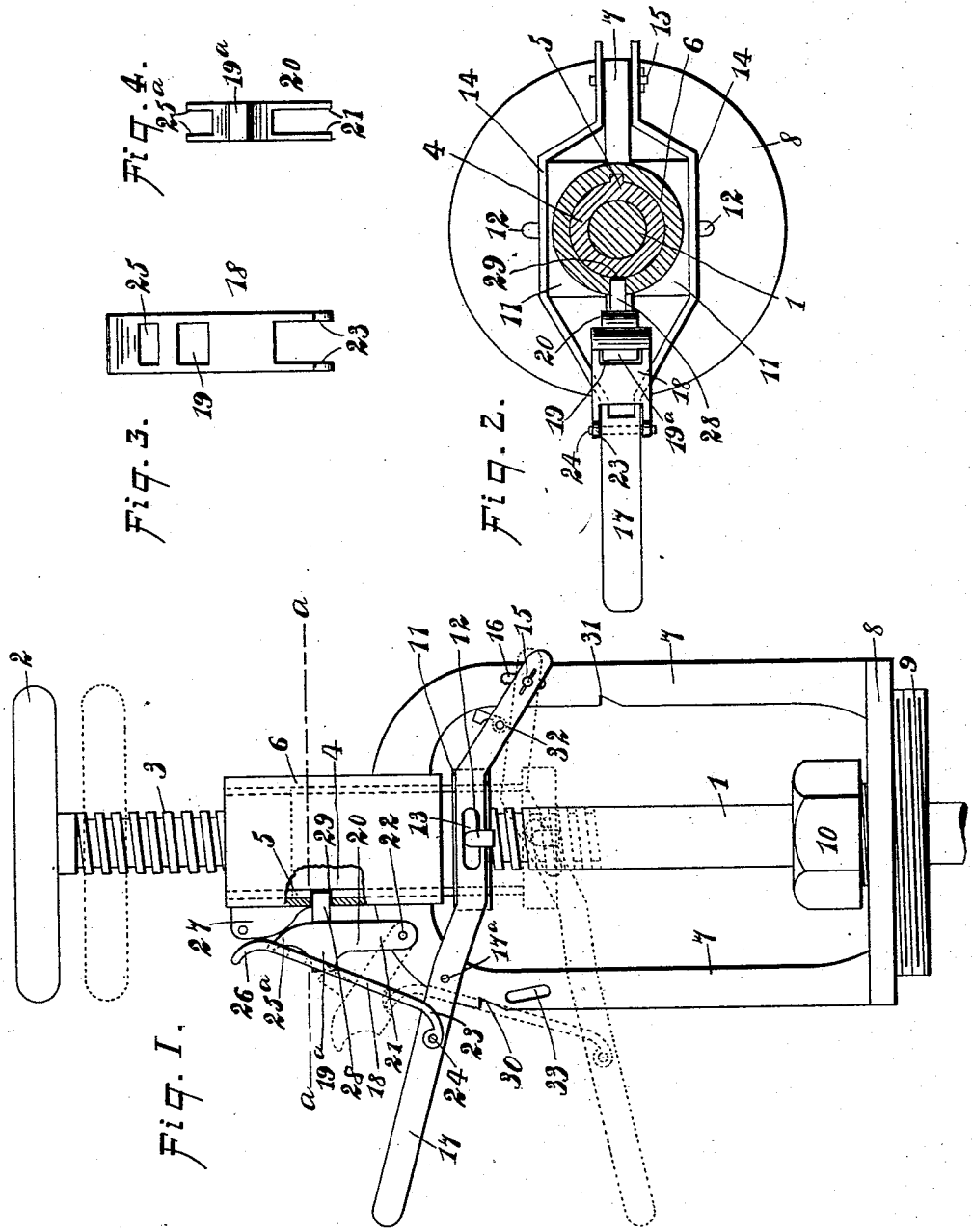

SIDNEY WINFIELD SAMPSON, OF HUDSON, MASSACHUSETTS.

VALVE.

SPECIFICATION forming part of Letters Patent No. 570,772, dated November 3, 1896.

Application filed March 10, 1896. Serial No. 582,516. (No model.)

*To all whom it may concern:*

Be it known that I, SIDNEY WINFIELD SAMPSON, of Hudson, in the county of Middlesex and State of Massachusetts, have invented new and useful Improvements in Valves, of which the following is a full, clear, and exact description.

This invention relates to certain improvements in valves, and has for its object to provide a valve having an operating mechanism so arranged and constructed that the valve may be either raised or lowered from or toward its seat gradually, so as to permit its position to be conveniently adjusted, or may be quickly reversed in position, the operating devices being of a simple and inexpensive nature adapted to be readily and conveniently manipulated so as to close the valve either quickly or gradually.

The invention consists in a valve having a screw-stem, a nut wherein the stem is arranged to screw, and a pivoted lever having means for securing it adjustably in position, the said lever being connected to the nut and arranged to move the same, together with the valve-stem carried by it.

The invention also contemplates certain novel features of the construction, combination, and arrangement of the various parts of the improved valve, whereby certain important advantages are attained and the device is made simpler, cheaper, and otherwise better adapted and more convenient for use than various other similar devices heretofore employed, all as will be hereinafter more fully set forth. The novel features of the invention will be carefully defined in the claims.

Reference is to be had to the accompanying drawings, forming a part of this specification, in which similar characters of reference indicate corresponding parts in all the views.

Figure 1 is a side elevation showing a device constructed in accordance with my invention. Fig. 2 is a section taken transversely through the valve-stem and nut in the plane indicated by the line *a a* in Fig. 1. Fig. 3 is a detached detail view showing the keeper employed in connection with the device, and Fig. 4 is a similar view showing the dog for holding the nut in a raised position.

In the views, 1 indicates the valve-stem, having a hand-wheel 2 at its upper end and provided with a screw-threaded upper portion 3 below said hand-wheel and screwing into a nut 4, having a circular form and provided at diametrically opposite sides with longitudinally-projecting ribs or feathers 5, said nut being arranged to slide longitudinally in a bearing-face 6, having at its opposite sides longitudinal grooves to receive said ribs or feathers 5, and supported upon arms or frame-bars 7, extending down, as shown in Fig. 1, and connected at their lower ends to a base-plate 8, having a screw-threaded boss 9, adapted to screw into the valve-casing. A central stuffing-box 10 is arranged on the base-plate 8, surrounding the lower end of the valve-stem 1, so that a tight joint may be formed at the point where said stem passes into the valve-casing.

The lower end of the nut 4 projects below the bottom of the bearing 6, as clearly shown in Fig. 1, and is provided with a rectangular enlargement or head 11, having pins 12 projecting from its opposite sides, and provided with downwardly-bent ends, which pins are arranged to work in slots 13, formed in the forks 14 of a lever, said forks being bent toward each other at their extremities, as clearly shown in Fig. 2, and being connected by a pivot-pin 15, arranged to work in a slot 16, formed in one of the downwardly-extending frame-bars 7 which support the bearing 6. The opposite ends of the forks 14 are connected together, as indicated at 17, to form an operating-handle for the said pivoted lever, which is arranged to swing in the plane of the axis of the valve-stem 1 and is guided upon that one of the frame-bars 7 which is opposite to the frame-bar whereon the lever is pivoted.

The forks 14 of the pivoted lever and the frame-bar 7 embraced between them are correspondingly perforated, as indicated at 17$^a$, to permit the lever to be locked by means of a pin or the like in its elevated position, as shown in full lines in Fig. 1, and on the handle portion 17 of said lever is carried a keeper 18, provided at its lower end with forks 23, pivoted, as indicated at 24, to opposite sides of the part 17 of the lever and provided with an opening 19, adapted to receive a lug or projection 19$^a$ on a dog 20, having forks 21, pivoted, as seen at 22, to opposite sides of the frame-bar 7 on which the operating-lever is guided, and provided at its upper end with ears 25ª, projecting from its opposite sides and arranged to engage an opening 25, formed in the keeper 18 above the opening 19. The upper end of the keeper 18 is bent or curved back, as indicated at 26, and said portion of the keeper is arranged to abut against a lug or projection 27, formed on one side of the bearing 6, wherein the nut 4 slides.

The dog 20 is provided on its side adjacent to the bearing 6 with a lug or finger 28, arranged, when the dog is in its elevated position, to pass through an opening in the wall of said bearing 6 into engagement with a recess 29, formed in one of the ribs or feathers 5 on the nut 4, so that, as will be seen, when said dog is in its elevated position, as shown in Fig. 1, the lever being at this time raised, said dog 28 will be engaged in said recess 29 and will serve to lock the nut 4 securely against longitudinal movement in its bearing 6. When the parts are thus positioned, it will be seen that the valve-stem 1 may be turned, its threaded portion 3 screwing through the nut 4, so as to move the valve contained in the valve-casing and carried on said stem 1 toward and from its seat, so as to gradually open and close the valve.

When it is desired to quickly close the valve, the handle 17 is thrown downward to the position indicated in dotted lines in Fig. 1, whereupon first the dog 28 will be withdrawn from engagement with the recess 29 in the nut, this being permitted by the length of the slot 16, wherein the pivot-pin 15 of the lever plays, permitting a slight pivotal movement of said lever upon the pins 12 at opposite sides of the lower end portion 11 of the nut 4. After the dog has been disengaged from the nut the lever will be swung downward, carrying with it the nut 4, so as to reverse the position of the valve carried on the valve-stem, and when said lever is in its lowered position, as indicated in dotted lines in Fig. 1, the keeper 18 will rest at its upper curved end 26 under the lug 19ª on the dog 20, being then in position to force said dog into operative position, and the opening 19 in the keeper 18 will be engaged with a tooth 30, formed upon the frame-bar 7, whereon the lever is guided, so as to serve to hold the lever in its lowered position. The opposite frame-bar 7 is likewise provided with a tooth 31, adapted to be engaged by a latch or dog 32, pivoted on the lever and arranged to be swung pivotally when said lever is in its lowered position, so as to engage with said tooth 31, and, if desired, the device may be constructed so that the lever may be arranged to project from either side of the valve-stem, for which purpose a slot 33 will be formed in the bar 7 opposite to the slot 16, for which purpose each frame-bar 7 may be provided with a slot 16 and teeth 30 and 31.

From the above description of the invention it will be seen that the device is of an extremely simple and inexpensive construction and permits the valve to be readily operated, so as to either quickly or gradually close the valve, and it will also be obvious that the invention is susceptible of some modification without material departure from its principles and spirit, and for this reason I do not wish to be understood as limiting myself to the exact form of the parts herein set forth.

It is to be further understood that, while the lever which operates the valve is shown and described as located and operating below the valve, I desire it to be understood that in practice I may locate such lever above the valve.

Having thus described my invention, I claim as new and desire to secure by Letters Patent—

1. The combination of a frame or casing, a valve-stem having a threaded portion, a nut wherein the threaded portion of the valve-stem screws, and a lever carrying the nut and arranged when moved, to move the nut in the direction of the axis of the valve-stem, substantially as set forth.

2. The combination of a frame or casing, a valve-stem having a threaded portion, a nut in which the threaded portion of the valve-stem is arranged to screw, a lever pivoted on the frame of the casing and connected with the nut, and means to hold the lever adjustably in position, said lever carrying the nut and being arranged when moved to move the nut in the direction of the axis of the valve-stem, substantially as set forth.

3. The combination of a frame or casing, a valve-stem having a threaded portion, a nut in which the threaded portion of the valve-stem is arranged to screw, a bearing on the frame or casing in which the nut is movable longitudinally, a dog having engagement with the nut and arranged to hold the same against longitudinal movement, and a lever operatively connected with the dog and arranged when moved, to move the same out of engagement with the nut, to permit the nut to be moved longitudinally in its bearing, substantially as set forth.

4. The combination of a frame or casing, a valve-stem having a threaded portion, a nut in which the threaded portion of the valve-stem is arranged to screw, a bearing on the frame or casing in which the nut is longitudinally movable, a dog having engagement with the nut to hold the same against longitudinal movement, and a lever connected to and arranged to move the dog out of engagement with the nut, said lever being also connected to the nut and arranged to move the same longitudinally when released from said dog, substantially as set forth.

5. The combination of a frame or casing, a valve-stem having a screw-threaded portion, a nut in which the threaded portion of the valve-stem is arranged to screw, a bearing on the frame or casing in which the nut is arranged to move longitudinally, a dog arranged to engage the nut to hold the same against movement, a pivoted lever connected to and arranged to move the nut longitudinally, and a keeper carried by the lever arranged to engage said dog and move the same out of engagement with the keeper, substantially as set forth.

6. The combination of a frame or casing having frame-bars, a valve-stem arranged between the frame-bars and having a threaded portion, a nut in which the threaded portion of the valve-stem is arranged to screw, a bearing carried on the frame or casing between the frame-bars, in which bearing the nut is longitudinally guided and movable, a lever having forks pivotally connected with one of the frame-bars and embracing and pivotally connected to the lower end of said nut, and means for securing said lever adjustably in position, substantially as set forth.

SIDNEY WINFIELD SAMPSON.

Witnesses:
GARDNER E. MACOMBER,
MAY WARREN.